(12) United States Patent
Thery

(10) Patent No.: US 6,978,692 B2
(45) Date of Patent: Dec. 27, 2005

(54) AUTOMATED TRANSMISSION DEVICE WITH TORQUE TRANSFER, IN PARTICULAR FOR A MOTOR VEHICLE

(75) Inventor: Pascal Thery, Amiens (FR)

(73) Assignee: Valeo Embrayages, Amiens Cedex (FR)

( * ) Notice: Subject to any disclaimer, the term of this patent is extended or adjusted under 35 U.S.C. 154(b) by 0 days.

(21) Appl. No.: 10/275,811

(22) PCT Filed: Mar. 15, 2001

(86) PCT No.: PCT/FR01/00786

§ 371 (c)(1),
(2), (4) Date: Sep. 30, 2003

(87) PCT Pub. No.: WO02/075179

PCT Pub. Date: Sep. 26, 2002

(65) Prior Publication Data

US 2004/0050197 A1    Mar. 18, 2004

(51) Int. Cl.[7] .............................................. F16H 3/08
(52) U.S. Cl. ...................................... 74/372; 74/337.5
(58) Field of Search .......................... 74/371–372, 325, 74/330, 333, 337.5, 355–361

(56) References Cited

U.S. PATENT DOCUMENTS

| | | | |
|---|---|---|---|
| 1,951,724 A * | 3/1934 | Bush | 477/77 |
| 2,971,403 A * | 2/1961 | Butterworth | 475/198 |
| 3,067,626 A | 12/1962 | Doerries et al. | |
| 3,527,113 A * | 9/1970 | Detra et al. | 74/371 |
| 3,600,962 A * | 8/1971 | Ivanchich | 74/331 |
| 4,673,055 A * | 6/1987 | Yamaoka et al. | 192/3.57 |
| 5,542,309 A * | 8/1996 | Wenger et al. | 74/337.5 |
| 5,542,310 A * | 8/1996 | Lee | 74/372 |
| 6,698,303 B2* | 3/2004 | Hoffmann et al. | 74/337.5 |

FOREIGN PATENT DOCUMENTS

| | | |
|---|---|---|
| DE | 198 07 374 A1 | 4/1999 |
| FR | 1 037 450 | 9/1953 |
| FR | 2063214 | 7/1971 |
| GB | 338 257 A | 11/1930 |
| JP | 08-109950 | 4/1996 |
| WO | WO 98/41779 | 9/1998 |
| WO | WO 98/48199 | 10/1998 |
| WO | WO 00/08356 | 2/2000 |
| WO | WO 00/08357 | 2/2000 |

* cited by examiner

Primary Examiner—Tisha Lewis
(74) Attorney, Agent, or Firm—Berenato, White & Stavish

(57) ABSTRACT

An automated transmission device with torque transfer having an input shaft (18) that supports drive pinions (20), each of which is engaged with a driven pinion (22) that is mounted freely rotating on a output shaft (12); controlled unidirectional locking mechanism (24) which are mounted between the shaft (12) and the driven pinions (22); and mechanical device for activating the locking mechanisms (24) in a positive manner including at least one cam (26) which translationally moves inside the output shaft (12).

24 Claims, 10 Drawing Sheets

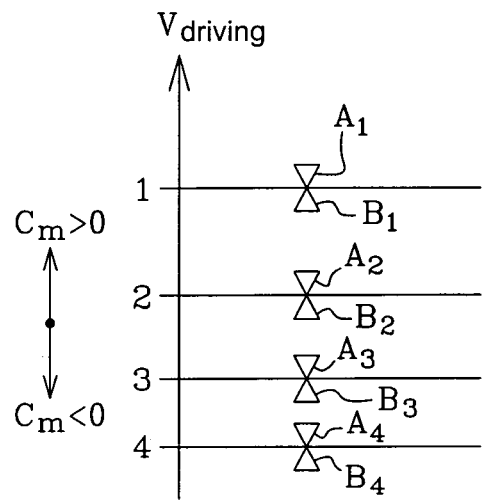
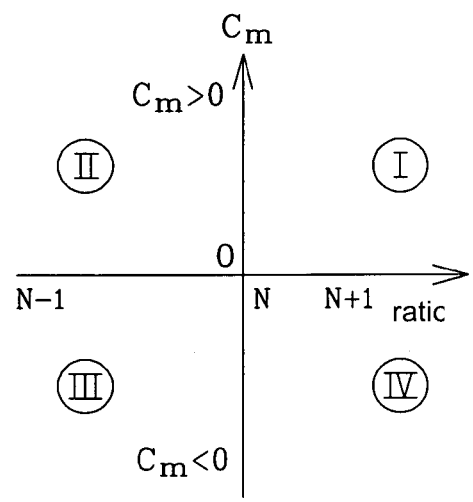
Fig. 4          Fig. 5
| $A_N$ | 1 | 1 | 0 |
|---|---|---|---|
| $B_N$ | 1 | 0 | 0 |
| $A_{N+1}$ | 0 | 0 | 1 |
| $B_{N+1}$ | 0 | 1 | 1 |
Fig. 6
| $A_N$ | 1 | 0 | 0 |
|---|---|---|---|
| $B_N$ | 1 | 1 | 0 |
| $A_{N-1}$ | 0 | 1 | 1 |
| $B_{N-1}$ | 0 | 0 | 1 |
Fig. 7

AUTOMATED TRANSMISSION DEVICE WITH TORQUE TRANSFER, IN PARTICULAR FOR A MOTOR VEHICLE

BACKGROUND OF THE INVENTION

The present invention concerns an automatic transmission device with torque transfer, in particular for a motor vehicle, allowing a change in transmission ratio without interruption of a rotation torque between a driving shaft and a driven shaft.

DESCRIPTION OF RELATED ART

Transmissions with torque transfer are already known, comprising an input shaft which is connected to a driving shaft by a clutch and which carries driving pinions, a driven shaft which carries driven pinions, each driving pinion being constantly in engagement with a driven pinion and defining a transmission ratio, the driving pinions being rotationally fixed to the input shaft and the driven pinions being free to rotate on the driven shaft and being associated with synchronisation and clutching means which make it possible to selectively connect a driven pinion and the driven shaft, for engaging a given transmission ratio.

One of the driving pinions, for example that of the last transmission ratio, is connected to the input shaft by a clutch, the corresponding driven pinion being rotationally fixed to the driven shaft. By controlling the clutch of the driving pinion of the last transmission ratio, it is possible to control the speed of rotation of the input shaft of the transmission during a change in transmission ratio and to make it adopt a given value allowing the engagement of a new transmission ratio.

The clamping of the clutch of the driving pinion of the last transmission ratio during a change in ratio also makes it possible to maintain a driving torque on the driven shaft during the change in ratio.

In the known torque-transfer transmission devices, controlling the synchronisation and clutching means is relatively tricky, the declutching having to take place when the driving torque of the driven pinion is substantially zero and the clutching having to take place when the speed of rotation of the driven pinion is equal to that of the driven shaft, so that the means controlling these synchronisation and clutching means must be relatively very precise and are relatively complex.

An automatic transmission with torque transfer is already known in which the usual synchronisation and clutching means are replaced by unidirectional locking mechanisms of the toothed wheel and pawl type, which are controlled by magnetic means comprising permanent magnets carried by a movable rod and cooperating by magnetic attraction or repulsion with permanent magnets carried by the toothed wheels and pawls of the unidirectional locking mechanisms. This "contactless" magnetic control has the drawback of not guaranteeing the movement of the pawls between their idle and service positions, the control rod carrying the permanent magnets being freely movable with respect to the pawls, even if the latter do not move as expected.

SUMMARY OF THE INVENTION

The aim of the invention is in particular to avoid these drawbacks of the prior art, whilst simplifying the control and actuation means used in an automatic transmission with torque transfer for a change in transmission ratio.

It proposes for this purpose a device of the aforementioned type, intended to connect a driving shaft and a driven shaft and comprising an input shaft, driving pinions mounted on the input shaft, driven pinions mounted on the driven shaft, each driving pinion being constantly in engagement with a driven pinion and defining a transmission ratio, one of the pinions of each ratio being rotationally fixed to its shaft and the other being free to rotate on its shaft, at least one clutch connecting the driving pinion of the last transmission ratio to the input shaft, and means of selective connection of each free pinion and its shaft for the engagement of the corresponding transmission ratio, these means comprising, for at least one free pinion, two controlled unidirectional locking mechanisms, mounted in opposite directions between the free pinion and its shaft in order to prevent a speed of rotation of the free pinion which is lower or respectively higher than the speed of rotation of its shaft and each being able to occupy two positions, one idle and the other service, characterised in that these locking mechanisms are associated with mechanical actuation means comprising at least one cam able to be moved in translation and/or rotation which acts positively on the said mechanisms in order to bring them into the service position, means of controlling the actuation means and the said clutch being provided for controlling the speed of rotation of the input shaft according to the change in transmission ratio to be effected, the change in ratio comprising a step of passing from an initial state in which a ratio is engaged, to an intermediate state in which the free pinion of the engaged ratio and the free pinion of the ratio to be engaged each have a mechanism for locking in the service position and a mechanism for locking in the idle position, a step of passing from this intermediate state to a final state in which the mechanisms for locking the free pinion of the ratio to be engaged are in the service position and those of the free pinion of the previously engaged ratio are in the idle position, and a step of controlling the clutch which takes place between the initial state and the final state.

The actuation by cam of the aforementioned unidirectional locking mechanisms guarantees the movement of these mechanisms into their service position by the movement of the cam which is itself controlled positively by mechanical means. The result is great security in functioning, allowing the automatic control of the transmission. In addition, the sequence of operations executed for a change in ratio is rapid and precise by virtue of the clutch control which makes it possible to control the speed of rotation of the input shaft in the required fashion for actuating the locking mechanisms.

According to another characteristic of the invention, the changes in transmission ratio which do not concern the last ratio comprise the same sequence of operations of actuating the unidirectional locking mechanisms for the increase and decrease in the ratios, this sequence being executed in a given order for the increase in the ratios and in the reverse order for the decrease in the ratios.

Because of this, the means of actuating the aforementioned unidirectional locking mechanisms can comprise a single actuator, which acts in one direction for an increase in the ratios and in the other direction for a decrease in the ratios. The result is great simplification of the control of the transmission.

In a first embodiment of the invention, the free pinions are disposed in the order of the transmission ratios and the device comprises a single cam able to be moved in translation inside the shaft carrying the free pinions.

In another embodiment, the free pinions are disposed on their shaft in the order 1, 3, 5, . . . , 2, 4, 6, . . . and the device comprises two cams able to be moved simultaneously in translation inside the said shaft, one for the actuation of the locking mechanisms for the free pinions for the ratios 1, 3, 5, the other for the actuation of the locking mechanisms for the free pinions for the ratios 2, 4, 6, . . . .

Advantageously, the two cams are carried by the same support and the travel of each cam is reduced by half compared with the embodiment comprising only one actuating cam for the aforementioned mechanisms.

In another embodiment of the invention, the free pinions are disposed on their shaft in the order 1, 4, 2, 5, 3, 6, the device then comprising three cams able to be moved simultaneously in translation inside the shaft carrying the free pinions, one for the actuation of the locking mechanisms for the free pinions for ratios 1 and 4, the second for the actuation of the locking mechanisms for the free pinions for ratios 2 and 5, and the third for the actuation of the locking mechanisms for the free pinion for ratio 3.

The invention thus makes it possible to vary the relative arrangement of the transmission ratios in a transmission device with torque transfer and therefore to choose a configuration according to the constraints imposed by other factors.

In a preferred embodiment of the invention, the cams are able to be moved in translation by a nut and screw system, where the nut carries the cams and the screw is a threaded rod driven in rotation by an actuator such as an electric motor.

Advantageously, the nut is guided in translation and immobilised with respect to rotation on a fixed axial rod on which it is engaged at one end, and screwed at its other end on the said threaded rod.

The cams can be fixed in rotation, or turn in synchronism with the shaft in which they are mounted.

In a particular embodiment of the invention, the cam or cams are mounted by screwing on a threaded rod fixed in translation and connected to a drive member by an epicyclic gear, preferably a double epicyclic gear.

In this case, the cam turns the driven shaft and remains immobile in translation with respect to the driven shaft whilst the drive member does not make the threaded rod turn in one direction or the other.

According to another characteristic of the invention, the transmission device comprises another clutch connecting the drive shaft to the input shaft, the pinion driving the first transmission ratio being rotationally fixed to the input shaft and the associated driven pinion being able to be rotationally connected with the driven shaft by two unidirectional locking mechanisms of the aforementioned type.

In a variant, the said other clutch connects the input shaft to the driving pinion of the first transmission ratio, whose driven pinion is rotationally fixed to the driven shaft.

This other clutch serves mainly for starting the vehicle.

Advantageously, filtering the vibrations are provided on the driving shaft and/or on the input shaft of the device according to the invention.

In general terms, the invention combines the advantages of automatic transmissions with hydrokinetic couplers and planetary gear trains and those of manual gear boxes, whilst avoiding their respective drawbacks.

The invention will be better understood and other characteristics, details and advantages thereof will emerge more clearly from a reading of the following description, given by way of example with reference to the accompanying drawings, in which:

BRIEF DESCRIPTION OF DRAWINGS

FIG. 4 is a graph showing diagrammatically the function of the unidirectional locking mechanisms for several transmission ratios;

FIG. 5 is a graph illustrating the four possible cases of change in transmission ratio according to the rotation torque applied to the driven shaft and the increase and decrease in the ratios;

FIGS. 6 and 7 are tables showing the states of the unidirectional locking mechanisms in two possible cases of change in transmission ratio;

DETAILED DESCRIPTION OF PREFERRED EMBODIMENTS

Figure 1:
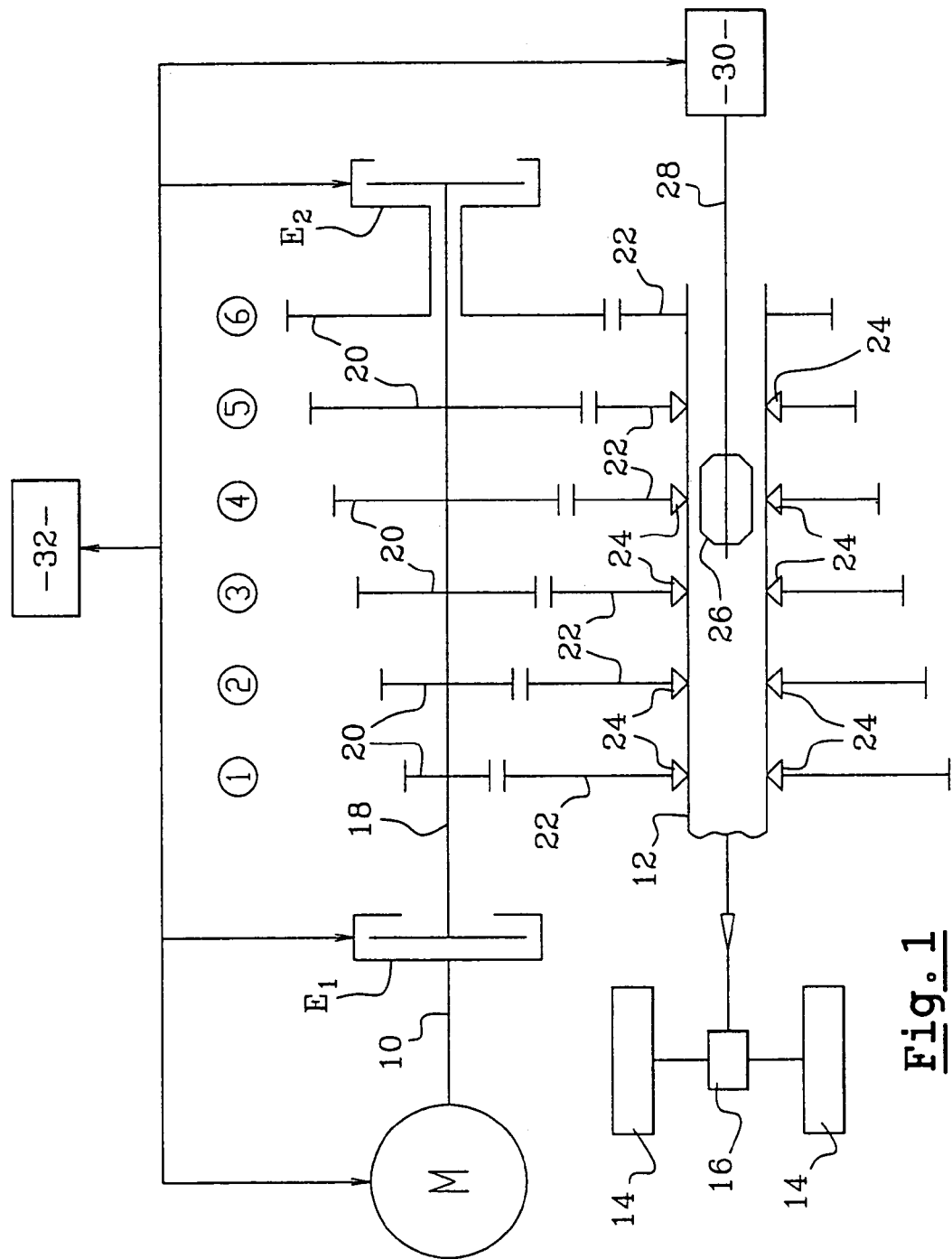
FIG. 1 is a schematic representation of a first embodiment of a transmission device according to the invention.

Reference is made first of all to FIG. 1, which shows schematically a first embodiment of an automatic transmission device with torque transfer according to the invention, intended to connect the output shaft 10 of a thermal engine M, such as in particular an internal combustion engine for a motor vehicle, to a driven shaft 12 which is the output shaft of the device according to the invention and which, in the case of a motor vehicle, is intended to drive driving wheels 14 in rotation by means of a differential 16.

The device according to the invention comprises an input shaft 18 which is connected to the output shaft 10 of the motor M by a clutch E1. The input shaft 18 is parallel to the output shaft 12 and carries driving pinions 20, each of which is in constant engagement with a driven pinion 22 mounted on the output shaft or driven shaft 12, the pairs of pinions in engagement 20, 22 defining transmission ratios which are numbered from 1 to 6 and which are progressively increasing, the pinions of the various transmission ratios being mounted in the order of these ratios on the shafts 18 and 12.

In this example embodiment, the driving pinions 20 for ratios 1 to 5 are rotationally fixed to the input shaft 18 and the driven pinions of these ratios are free to rotate on the driven shaft 12 and can be rotationally fixed thereto by means of controlled unidirectional locking means 24, each free pinion 22 being associated with two controlled unidirectional locking mechanisms 24 which are mounted in opposite directions between the pinion 22 and the shaft 12, one of these mechanisms being intended to prevent the free pinion 22 from turning more quickly than the driven shaft 12, the other mechanism being intended to prevent the free pinion 22 from turning less quickly than the shaft 12.

The driving pinion 20 of the sixth transmission ratio is free to rotate on the input shaft 18 and is rotationally fixed thereto by means of a clutch E2, which is for example mounted on the end of the input shaft 18 on the side opposite to the input clutch E1.

The driven pinion 22 of the sixth transmission ratio is rotationally fixed to the driven shaft 12 and does not have any controlled unidirectional locking mechanism 24.

The actuation means of the mechanisms 24 are advantageously housed within the driven shaft 12 and comprise at least one cam 26 mounted on an axial rod 28, one end of which is connected to an actuator 30, outside the driven shaft 12. A system 32 for managing and controlling the device according to the invention is connected to the clutches E1 and E2 and to the actuator 30 for controlling the changes in transmission ratio and is also connected to means of controlling the motor M for exchanges of information or actions.

The cam 26 can be mounted so as to be fixed in rotation within the driven shaft 12 and is then moved in translation inside the shaft 12, between the unidirectional locking mechanisms 24 for the free pinions 22 of the first five transmission ratios by the axial rod 28 which is itself driven by the actuator 30 in translation inside the shaft 12 or in rotation, the axial rod 28 then being a threaded rod fixed in translation, on which the cam 26 is mounted by screwing.

Figure 2:
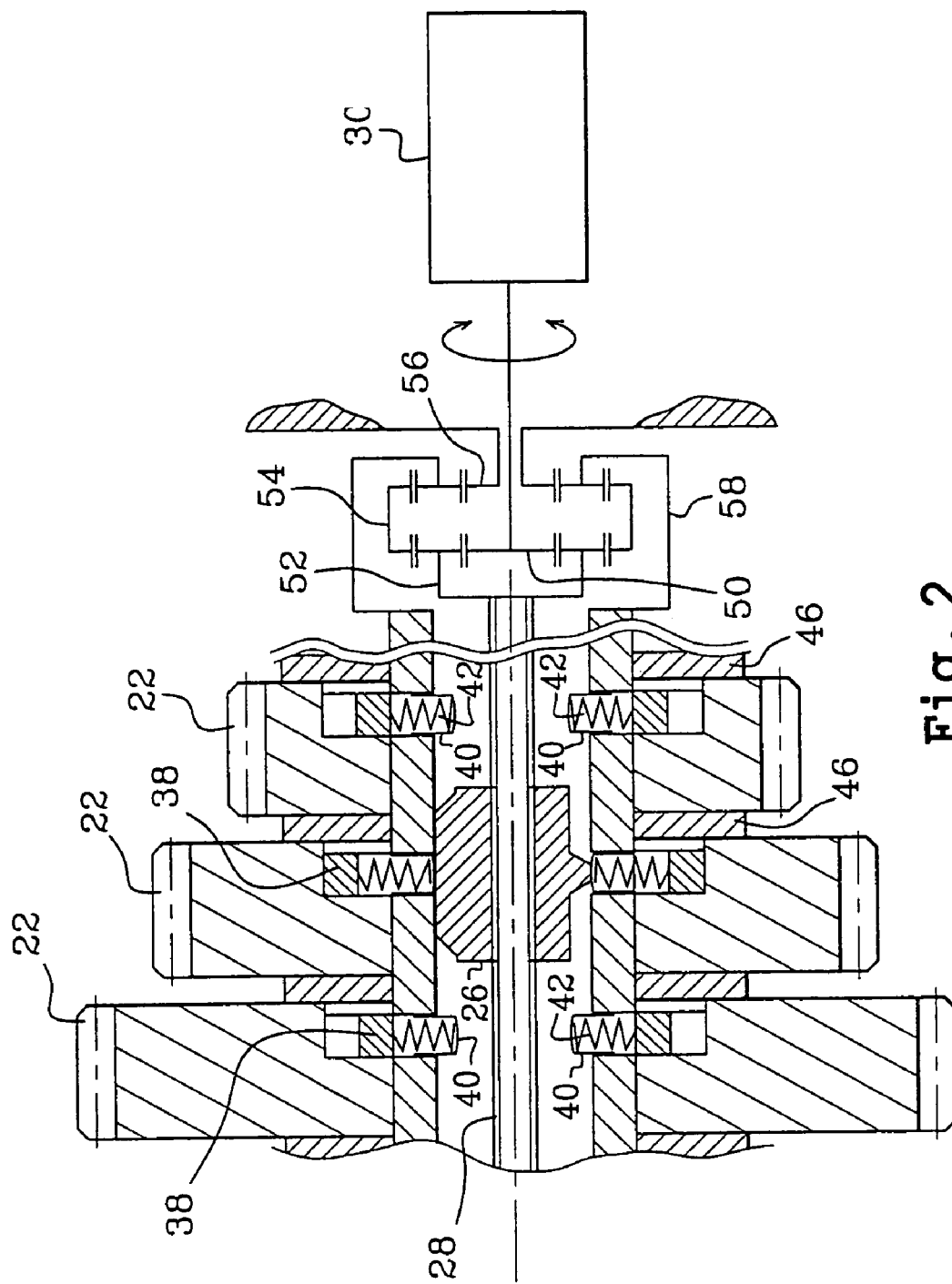
FIG. 2 is a partial schematic view of a variant embodiment of the invention.
Figure 3:
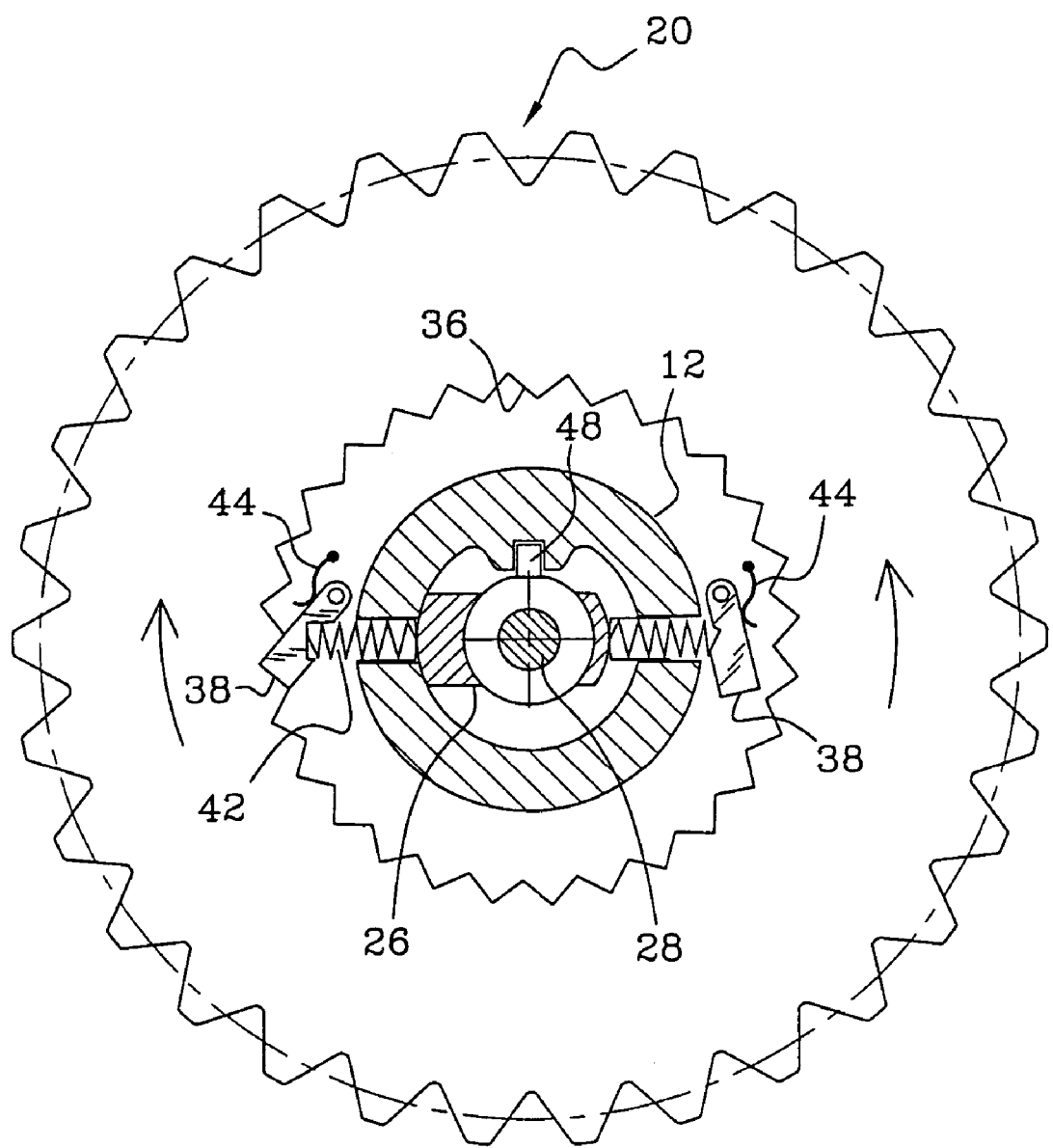
FIG. 3 is an axial schematic view of a unidirectional locking mechanism according to the invention.

A particular embodiment of the unidirectional locking mechanisms and their actuation means is depicted in detail in FIGS. 2 and 3.

In this example embodiment, an internal set of teeth 36 is formed in a large face of each free pinion 22 in order to cooperate with at least two pawls 38 rotationally fixed to the shaft 12 and each of which is able to be moved by a pusher 40 between an idle position in which it is away from the set of teeth 36 on the pinion 22 and a service position in which it is in engagement with the set of teeth, preventing the rotation of the pinion 22 about the shaft 12 in a given direction, which is indicated by an arrow close to each pawl 38.

The pushers 40 are guided in radial holes in the cylindrical wall of the shaft 12 and are able to be moved radially outwards by the cam 26. The pushers 40 act on the pawls 38 by means of elastically deformable means 42 such as compression springs, which are mounted between the pushers 40 and the pawls 38.

Advantageously, the pushers 40 are tubular and the springs 42 are partly housed inside the pushers 40 and bear on the bottom of these pushers.

Other elastic members 44 such as spring blades push the pawls 38 in the direction tending to move them away from the internal set of teeth 36 on the pinion 22.

The pawls 38 and the spring blades 44 are mounted on bracing washers 46 which are rotationally fixed at the shaft 12 and which are arranged between the free pinions 22, as depicted in FIG. 2.

The cam 26 is mounted on the rod 28 and is rotationally fixed to the shaft 12, by means of a longitudinal rib 48 engaged in a corresponding groove on the internal surface of the shaft 12.

The rod 28 is fixed in translation to the inside of the shaft 12 and is connected to the actuator 30 by an epicyclic gear and preferably a double gear such as the one shown in FIG. 2.

In this embodiment, the output shaft of the actuator 30, which is for example a small electric motor, is connected to the sun pinion 50 of a first epicyclic gear, the planet carrier 52 of which is fixed to one end of the threaded axial rod 28 and the crown wheel 54 of which is fixed to that of a second epicyclic gear. The sun pinion 56 of this second gear is fixed with respect to rotation and its planet carrier 58 is rotationally fixed to the shaft 12. The pinion ratios are the same in the two epicyclic gears, the first of which forms a differential and the second a reducing gear. Under these circumstances, the cam 26, which is driven in rotation by the shaft 12, is fixed in translation to the axial rod 28 whilst the output shaft of the actuator 30 does not turn. The rotation of this output shaft in one direction or the other makes it possible to move the cam 26 in translation in one direction or the other inside the shaft 12.

As the double epicyclic gear which connects the actuator 30 to the shaft 12 and to the threaded rod 28 transmits practically no force, it can be produced conveniently from plastics material, at a relatively very low cost.

In the example embodiment in FIGS. 2 and 3, the two controlled unidirectional locking mechanisms 24 which are associated with a free pinion 20 are on the same flank of the pinion and are diametrically opposed with respect to the axis of rotation.

In a variant embodiment, these two mechanisms could be one on one flank of the pinion and the other on the other flank of the pinion, each mechanism being able to have a single pawl or several.

The cam 26 is a substantially cylindrical tubular piece whose external surface is formed so as to comprise abutment surfaces making it possible to move the pushers 40 radially towards the outside when the corresponding locking mechanisms have to be in the service position. As will be seen below, one and the same cam can successively control all the locking mechanisms for the free pinions for the various transmission ratios, when it is moved in one direction, for an increase in the transmission ratios and, when it is moved in the other direction, for a decrease in the ratios.

Reference is now made to FIGS. 4 to 9 in order to describe the functioning of the device according to the invention.

In the following, it is assumed that the speed of rotation of the shaft 12 is constant and it is in this case that the way in which the changes in transmission ratio are controlled and effected will be described.

Use will be made in this description of the following conventions, which are illustrated by FIGS. 4 and 5.

FIG. 4 is a graph depicting the staging of the rotation speeds of the driving shaft corresponding to the first four transmission ratios for a given constant speed of the output shaft 12. The references A1, B1, A2, B2, A3, B3 and A4, B4 designate respectively the unidirectional locking mechanisms 24 associated with the driven pinions 22 of the first four transmission ratios and their actions on the pinions, according to the rotation torque transmitted to the output shaft 12, which can be a positive driving torque designated by $Cm>0$ exerting a traction on the vehicle or a negative driving torque designated by $Cm<0$ exerting a braking on the vehicle, and a direction of variation in the speed of rotation of the driving shaft 10, this speed being indicated by increasing values on the vertical axis in FIG. 4.

In this figure, the references A are allocated to the unidirectional locking mechanisms which prevent the free pinions 22 from turning more quickly than the output shaft 12 and the references B are allocated to the mechanisms 24 which prevent them from turning less quickly than the shaft 12.

FIG. 5 shows schematically the four possible cases of change in transmission ratio according to the driving torque and the increase or decrease in the transmission ratios.

Cases I and II are those for which the rotation torque applied to the shaft 12 is positive, case I corresponding to the increase (change from ratio N to ratio N+1) and case II to that of decrease (change from ratio N to ratio N−1).

Cases III and IV are those where the driving torque applied to the shaft 12 is a negative torque (Cm<0), case III being that of the decrease from the ratio N to the ratio N−1 and case IV that of the increase from the ratio N to the ratio N+1.

The table in FIG. 6 shows the states of the unidirectional locking mechanisms for the free pinions of ratios N and N+1 in the case of the change from the ratio N to the ratio N+1 with a positive driving torque. The commands for clutches E1 and E2 are shown schematically in FIG. 8 as a function of time.

Initially, the ratio N being engaged, the locking mechanisms associated with the driven pinion 22 of this ratio are in the service position, which corresponds to $A_N=B_N=1$, the clutch E1 connecting the driving shaft 10 to the input shaft 18 being clamped or engaged, the clutch E2 associated with the driving pinion of the sixth transmission ratio being released or declutched (as a general rule, the state at rest of a clutch is its engaged or clamped state, and its activated state is the declutched state).

Under these circumstances, the pawl or pawls of the mechanism $A_N$ which prevent the driven pinion 22 of the ratio N from turning more quickly than the shaft 12 are in abutment on the internal set of teeth 36 on the driven pinion, because of the fact that the driving torque transmitted to the shaft 12 is positive. When a command to change transmission ratio is given in order to change to the higher ratio N+1, the pawl or pawls of the mechanism $B_N$ which prevent the pinion 22 from turning less quickly than the shaft 12 are not in abutment on the internal set of teeth 36 on the driven pinion, and can therefore be disengaged from this set of teeth. As the driven pinion of the ratio N+1 is driven by its driving pinion at a speed of rotation which is greater than that of the shaft 12, the mechanism $B_{N+1}$ of this pinion can be brought into the service position.

A movement of the cam 26 inside the shaft 12 simultaneously controls the bringing to rest of the mechanism $B_N$ and the bringing into service of the mechanism $B_{N+1}$. This then gives the state depicted in the second column of the table in FIG. 6.

Figure 8:
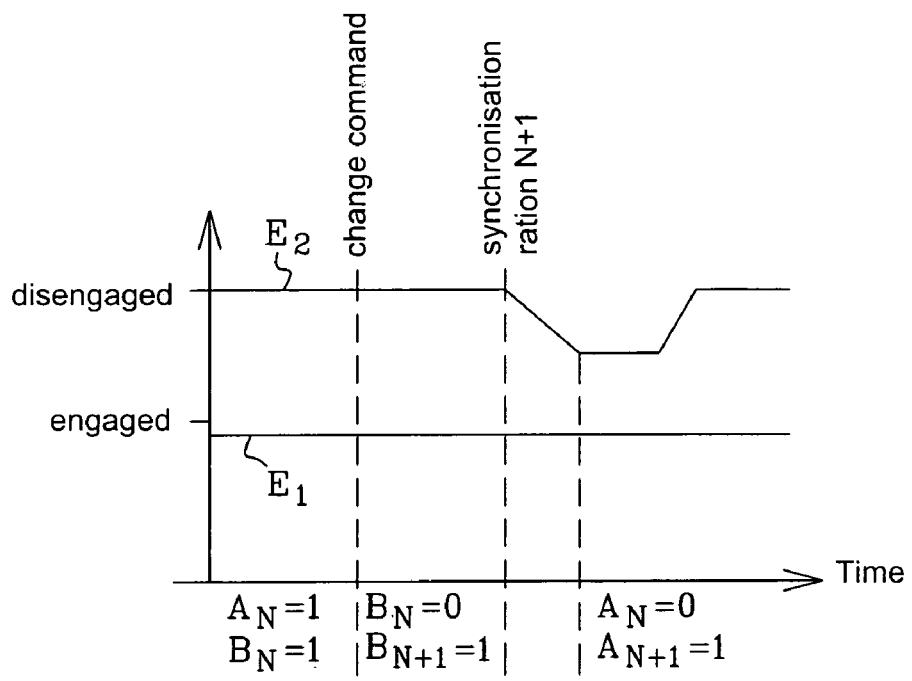
FIGS. 8 and 9 are graphs illustrating the clutch commands during changes in transmission ratio corresponding to the tables in FIGS. 6 and 7 respectively.

Next, the clutch E2 is actuated in order to make it pass from the partially engaged state, which will make it possible to transmit a torque through the driving pinion 20 of the sixth transmission ratio to the input shaft 18 and therefore slow down the speed of rotation of this input shaft, since the output shaft 12 which rotates at a constant speed is then connected to the input shaft 18 by the sixth transmission ratio (FIG. 8).

The partial or progressive damping of the clutch E2 therefore causes a reduction in the speed of rotation of the input shaft 18 to a value equal to the speed of synchronisation with the output shaft 12 by means of the ratio N+1. Under these circumstances, it is possible to bring the mechanism $A_N$ to the idle state, since its pawl or pawls are no longer in abutment on the set of internal teeth on the associated pinion, and simultaneously to bring the mechanism $A_{N+1}$ into the service position.

This then gives a state corresponding to the third column in the table in FIG. 6, illustrating the engagement of the ratio N+1.

The states $A_N=0$ and $A_{N+1}=1$ are obtained simultaneously, by movement of the cam 26 in the same direction as before.

The clutch E2 is next unclamped or declutched for complete engagement of the ratio N+1, with a resumption of abutment on $A_{N+1}$.

During the change from ratio N to N+1, a positive driving torque is transmitted continuously to the shaft 12, first of all by the mechanism $A_N$ of the ratio N as far as at least partial clamping of the clutch E2, and then by the sixth transmission ratio for a brief moment, and finally by the mechanism $A_{N+1}$ of the ratio N+1, the total duration of the change in transmission ratio being around one second or less.

Figure 9:
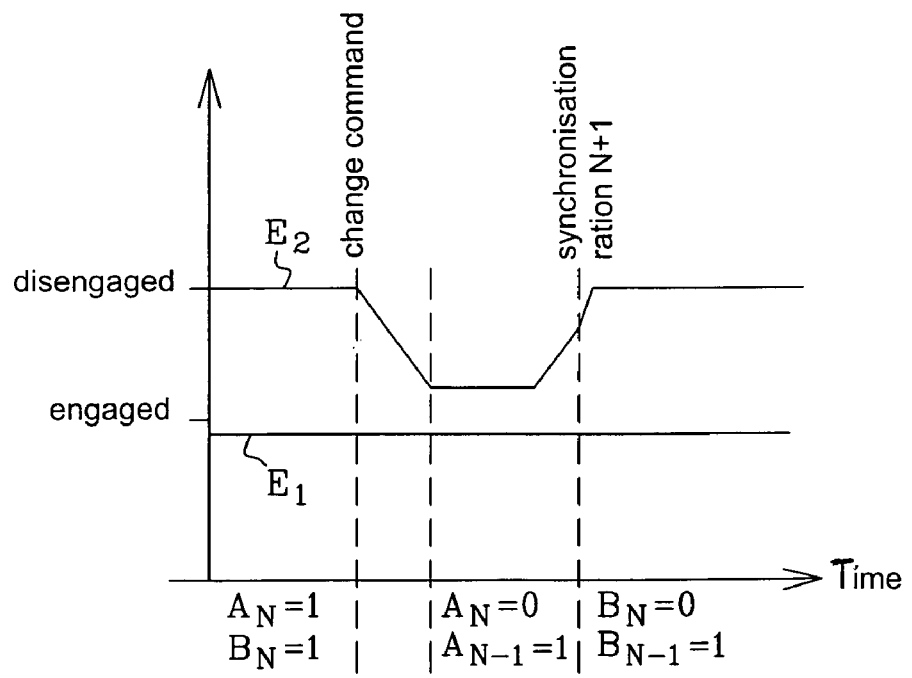

When the change in transmission ratio takes place under conditions corresponding to case II (positive driving torque applied to the output shaft 12 and change from the ratio N to the ratio N−1), the following procedure is followed, summarised in the table in FIG. 7 and depicted schematically in FIG. 9, with a succession of operations controlling the locking mechanisms which is identical to that described for case I but which is performed in the opposite direction.

The starting point is the state corresponding to the first column in the table in FIG. 8, with $A_N=B_N=1$, the ratio N being engaged, and $A_{N-1}=B_{N-1}=0$.

When a command to change to the ratio N−1 is given, the clutch E2 of the driving pinion of the sixth transmission ratio is partially clamped in order to transmit a torque at least equal to the driving torque and to reduce the speed of rotation of the input shaft 18, as already indicated above, and the cam 26 is moved towards the pinion 22 of the ratio N−1 in order to bring the locking mechanism $A_N$ to rest and the mechanism $A_{N-1}$ into service, which corresponds to the second column in the table in FIG. 7. Next, the clutch E2 is progressively unclamped, which transmits less torque, which has the effect of making it possible to increase the speed of rotation of the input shaft 18 and to come into abutment on $A_{N-1}$. Then the rapid unclamping of the clutch E2 is finished and the cam 26 is moved once again, in the same direction, in order to bring the locking mechanism $B_N$ to rest and the mechanism $B_{N-1}$ into service, which corresponds to the third column in the table in FIG. 7.

By comparing the tables in FIGS. 6 and 7, it is noted that the sequences of operations controlling the locking mechanisms which are executed in order to change from the transmission ratio with a positive driving torque are opposite to each other for an increase in the transmission ratios and for their decrease. This assumes of course that the locking mechanisms are arranged in the same way on all the driven pinions 22 of the transmission ratios 1 to 5.

When the driving torque applied to the output shaft is negative (the vehicle is under motor braking), cases I and II, which have just been described, are returned to, in order to change transmission ratio, by means of a temporary control of the motor M in order to give a positive value to the driving torque applied to the output shaft, this positive value preferably being fairly low.

The same procedure is followed when the driving torque applied to the shaft 12 has a value close to zero. This modification, of very short duration (less than one second for example), is not perceptible to the driver of the vehicle but makes it possible to use a single control law for all the cases of change in transmission ratio.

Consequently the same actuator controlled by the management system 32 makes it possible to effect all possible cases of change in transmission ratio.

When it is necessary to change from the fifth to the sixth transmission ratio with a positive driving torque, the procedure as described with reference to FIGS. 6 and 8 is followed, but the clutch E2 is left engaged in order to keep the sixth transmission ratio engaged.

In the opposite direction, when it is necessary to pass from the sixth to the fifth ratio, the procedure is followed as depicted in FIG. 9, without having to first of all actuate the clamping of the clutch E2.

In all cases, the clutch E1 remains in the clamped state, this clutch being used solely for the starting of the vehicle (passage from neutral to the first transmission ratio).

This clutch also serves for passing from neutral to reverse.

Figure 10:
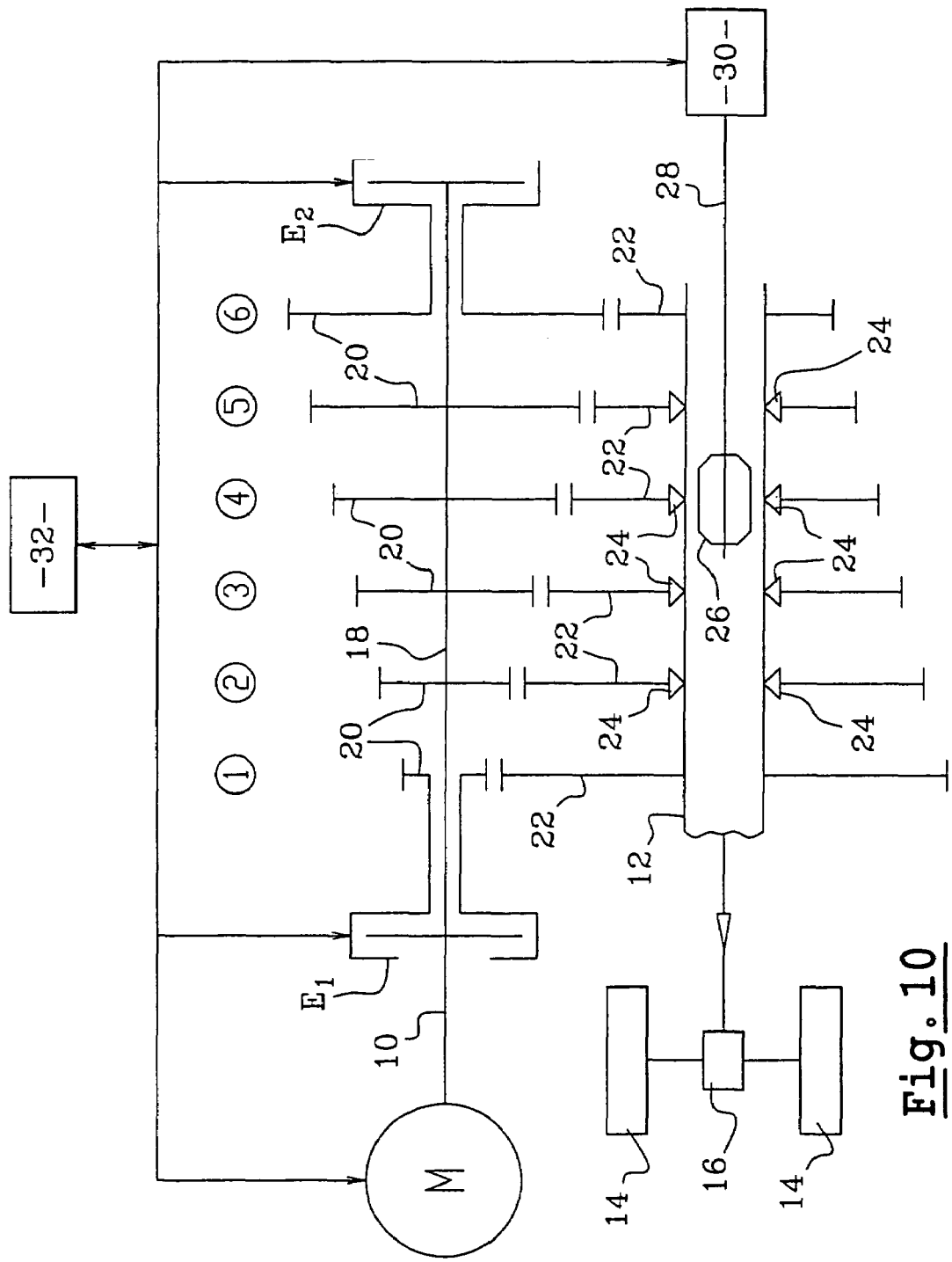
FIG. 10 is a schematic representation of a variant embodiment of the device according to the invention.

In the variant embodiment depicted schematically in FIG. 10, the arrangement of the various pinions on the input and output shafts is identical to that described with reference to FIG. 1, but the driving pinion 20 of the first transmission ratio is free to rotate on the input shaft 8 and can be fixed with respect to rotation with the latter by means of the clutch E1. The driven pinion 22 of the first transmission ratio is fixed rotationally to the output shaft 12 and is not equipped with any aforementioned locking mechanisms 24.

For the rest, this transmission device is identical to that of FIG. 1.

The functioning for the changes in transmission ratio is identical to that which has just been described, except with regard to the first transmission ratio, which is controlled directly by the clutch E1. The passage from the first to the second transmission ratio takes place by releasing the clutch E1 and clamping the clutch E2, and then proceeding as depicted in FIG. 8.

The change from the second to the first transmission ratio takes place by first of all clamping the clutch E2 and then, after setting A2 and B2 to idle, by clamping the clutch E1 and simultaneously releasing the clutch E2.

Figure 11:
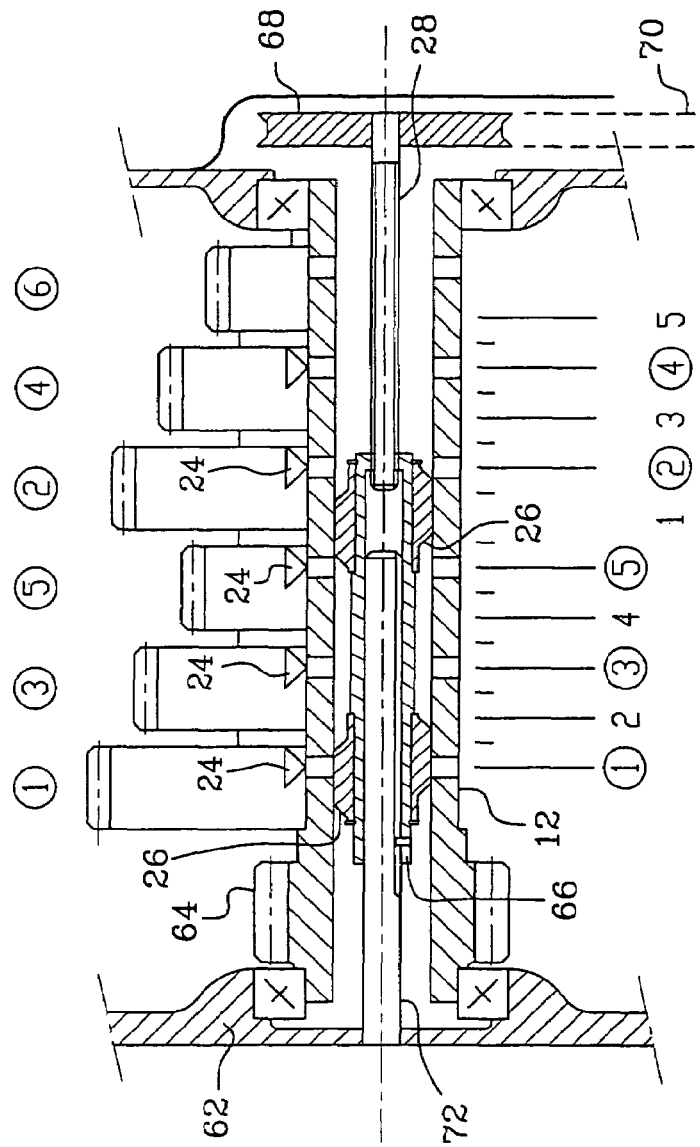
FIG. 11 is a partial schematic representation in axial section of the part of the device comprising the driven shaft.

In the variant embodiment depicted in FIG. 11, the output shaft 12 is supported at its ends by bearings mounted in a casing 62 and comprises an output pinion 64 at one of its ends.

Two cams 26 are mounted so as to rotate on a tubular support 66, one end of which forms a nut screwed onto the end of a threaded axial rod 28, the other end of which comprises a pulley 68, a pinion or the like, connected by a synchronous transmission 70 to the actuator 30, which is offset.

The other end of the tubular element 66 is guided in translation on a fixed axial rod 72 mounted on a wall of the casing 62 and comprising a longitudinal groove in which there is engaged a toe carried by the tubular element 66, for immobilising this element with respect to rotation.

The axial rods 28 and 72 are aligned, almost end to end, inside the output shaft 12.

In this device, the driven pinions 22 of the various transmission ratios are mounted in alternation on the output shaft 12, in the order 1, 3, 5, 2, 4, 6, the corresponding driving pinions being mounted in the same order on the input shaft. One of the cams 26 controls the locking mechanisms for the driven pinions of ratios 1, 3 and 5, the other cam 26 controlling the locking mechanisms for the driven pinions of ratios 2 and 4.

It can be seen in FIG. 11 that the cams 26 which act on the diametrically opposed locking mechanisms of each free pinion 22 have symmetrical profiles with respect to a median point, situated on the rotation axis, for the actuation of the mechanisms in accordance with the sequences depicted in FIGS. 6 and 7.

In FIG. 11, the positions of the cams corresponding to the actuation of the locking mechanisms of a driven pinion are indicated by lines marked with figures surrounded by a circle. The lines marked by figures not surrounded by a circle indicate the positions adopted by a cam when it is the other cam which acts on locking mechanisms of a driven pinion. For example, the FIG. 2 situated between FIGS. 1 and 3 entered in circles indicates the position of the left-hand cam when the right-hand cam is in the position of actuation of the locking mechanisms of the driven pinion of the second ratio, this position being indicated by the FIG. 2 surrounded by a circle. The small intermediate lines between the positions marked by figures corresponds to intermediate positions occupied by the cams during a change in transmission ratio.

This design has a reduced axial dimension, by virtue of the driving of the cams by a nut and screw system of reduced length, nevertheless allowing good axial guidance of the cams and rotational immobilisation of their support.

Figure 12:
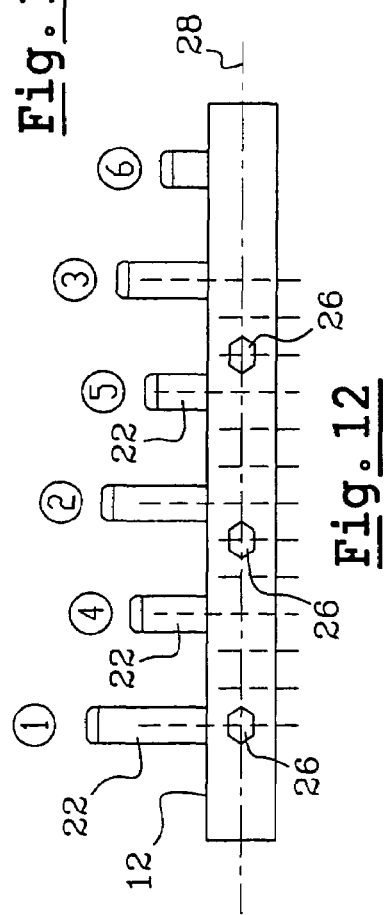
FIG. 12 is a partial schematic view illustrating a different arrangement of the transmission ratios in a device according to the invention.

In the variant embodiment depicted schematically in FIG. 12, the driven pinions (and the driving pinions) of the various transmission ratios are disposed in the order 1, 2, 5, 3, 6 and the means of actuating the locking mechanisms associated with these pinions comprise three cams 26 able to be moved simultaneously in translation inside the shaft 12 by the axial rod 28, each cam being able to occupy four positions which are represented by transverse broken lines. The left-hand cam 26 can actuate the locking mechanisms for the driven pinions of ratios 1 and 4, the cam 26 in the middle can actuate the locking mechanisms for the driven pinions of ratios 2 and 5, and the right-hand cam 26 can actuate the locking mechanisms for the driven pinion of the third ratio.

Various modifications can be made to the devices which have just been described, without departing from the scope of the invention. For example, the free pinions can be carried by the input shaft 18 rather than by the input shaft 12. As a variant, some free pinions can have been mounted on the input shaft 18 whilst the others are on the output shaft 12. It is advantageous for all the free pinions to be associated with controlled unidirectional locking mechanisms of the type described, but some of them could be equipped with usual synchronisation and clutching means, if necessary.

Naturally, the transmission device according to the invention comprises a reverse running ratio, of which a driving pinion is mounted on the input shaft 18, of which an intermediate pinion for reversing the direction of rotation is mounted on an intermediate shaft parallel to the shafts 12 and 18 and of which a driven pinion is mounted on the output shaft 12 and is equipped either with usual synchronisation and clutching means, or controlled unidirectional locking mechanisms of the type indicated above.

Figure 13:
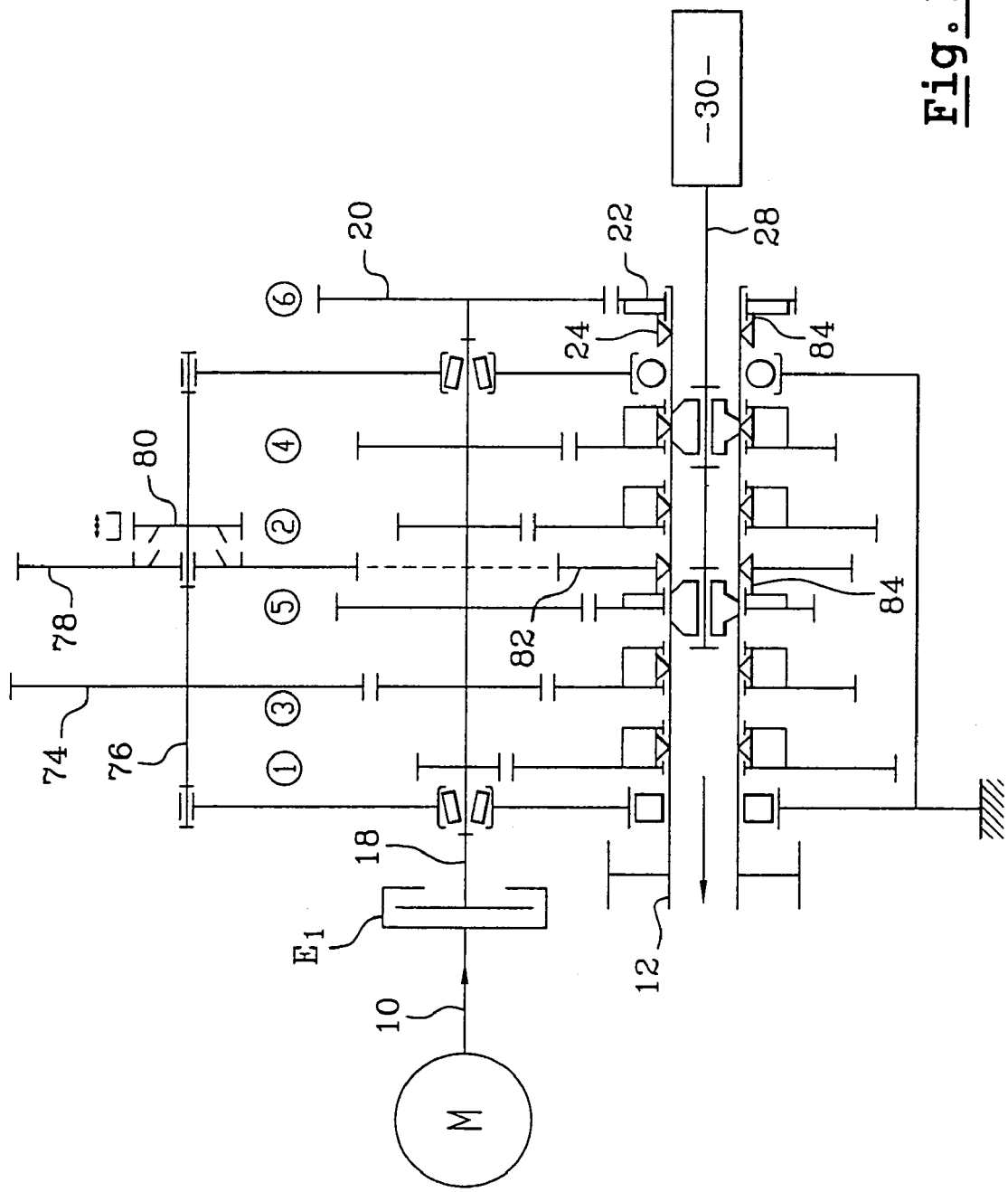
FIG. 13 is a schematic representation of another variant embodiment of the invention.
Figure 14:
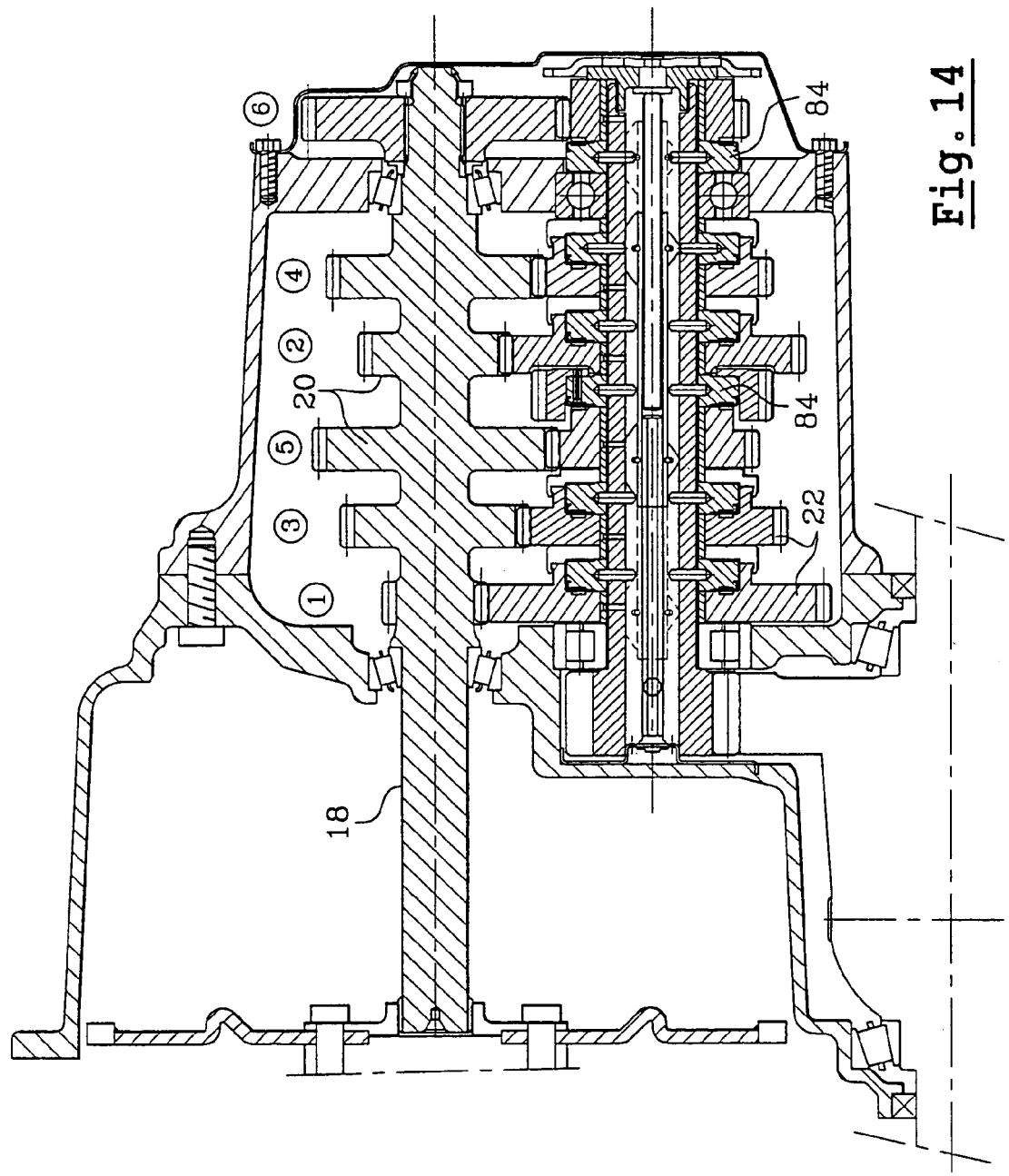
FIG. 14 is a schematic view in axial section of this variant.

In the embodiment depicted in FIGS. 13 and 14, the driving pinion of the reverse running ratio is the pinion 20 of the third transmission ratio, which is in engagement with a pinion 74 mounted fixed on the intermediate shaft 76. An intermediate pinion 78 for reversing the direction of rotation is free in rotation on the intermediate shaft 76 and is associated with conventional synchronisation and clutching means 80 mounted on the intermediate shaft 76. The intermediate pinion 76 is in engagement with a pinion 82 which is mounted fixedly on the output shaft 12 and which is therefore fixed rotationally thereto. The pinion 20 of the sixth transmission ratio is mounted fixedly on the input shaft 18 and its driven pinion 22 is connected to the output shaft 12 by controlled unidirectional locking mechanisms 24 of the type described above.

When the driven pinions 22 have a relatively small diameter, as is the case with the driven pinions of the fifth and sixth transmission ratios, it is not possible to use the method of mounting the locking mechanisms which is depicted in FIGS. 2 and 3 and therefore an annular piece or a hub which comprises the controlled unidirectional locking mechanisms and which is juxtaposed axially with the corresponding driven pinion is therefore associated with these pinions. This is what is depicted in FIGS. 13 and 14, when the reference 84 designates the annular pieces or hubs comprising the unidirectional locking mechanisms for the driven pinions of the fifth and sixth transmission ratios.

The functioning of the device depicted in FIGS. 13 and 14 is identical to the functioning of the other devices depicted in the previous figures. In these other embodiments, the clutch E2 associated with the driving pinion for the sixth transmission ratio made it possible to have the lowest speed of the input shaft 18. In the embodiment in FIGS. 13 and 14, it is the synchronisation means associated with the intermediate reverse pinion 78 which make it possible to give the input shaft 18 the lowest rotation speed: it is in fact possible, for this purpose, to brake the rotation of the input shaft 18 or to tend to drive it in the opposite direction. In the latter case, which corresponds to the embodiment in FIGS. 13 and 14, use is made solely of the synchronisation means of the reverse pinion 78, but without using the clutching means.

Figure 15:
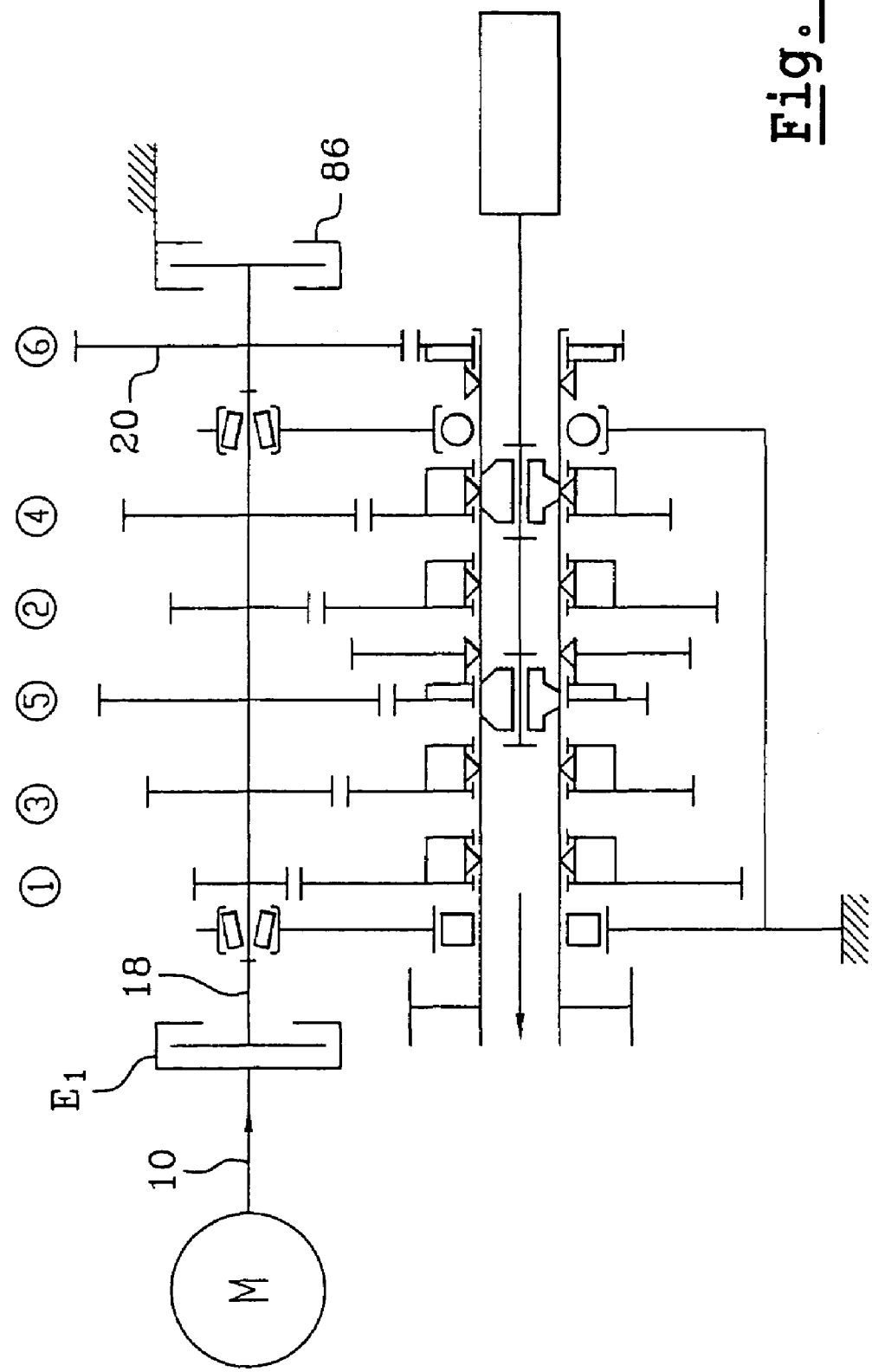
FIG. 15 is a schematic representation of another variant embodiment of the invention.

In the variant embodiment depicted in FIG. 15, the rotation of the input shaft 18 is slowed down by means of a brake 86 carried by the casing of the transmission device and which acts on the input shaft 18, for example at the end of this shaft situated on the side of the driving pinion 28 of the sixth transmission ratio.

For the rest, the same arrangement as in FIGS. 13 and 14 is found, the driving pinion 20 of the sixth transmission ratio being fixed to the input shaft 18.

Another variant embodiment consists of lowering the rotation speed of the input shaft 18 using motor control means, but this results in a slower reduction in the rotation speed of the input shaft 18.

What is claimed is:

1. Automatic transmission device with torque transfer, intended to connect a driving shaft (10) and a driven shaft (12) and comprising an input shaft (18), driving pinions (20) mounted on the input shaft, driven pinions (22) mounted on the driven shaft (12), each driving pinion being constantly in engagement with a driven pinion (22) and defining a transmission ratio, one of the pinions of each ratio being rotationally fixed to its shaft and the other being free to rotate on its shaft, at least one clutch (E2) connecting the driving pinion of the last transmission ratio to the input shaft (18), and means of selective connection of each free pinion and its shaft for the engagement of the corresponding transmission ratio, comprising, for at least one free pinion, two controlled unidirectional locking mechanisms (24), mounted in opposite directions between the free pinion (22) and its shaft (12) in order to prevent a speed of rotation of the free pinion which is lower or respectively higher than the speed of rotation of its shaft (12) and each being able to occupy two positions, one idle and the other service, wherein the locking mechanisms (24) are associated with mechanical actuation means comprising at least one cam (26) able to be moved in translation and/or rotation which acts positively on the said mechanisms in order to bring them into the service position, and means (32) of controlling the actuation means (26, 28, 30) and the clutch (E2) for controlling the speed of rotation of the input shaft (18) according to the change in transmission ratio to be effected, the change in ratio comprising a step of passing from an initial state in which a ratio is engaged, to an intermediate state in which the free pinion of the engaged ratio and the free pinion of the ratio to be engaged each have a mechanism for locking in the service position and a mechanism for locking in the idle position, a step of passing from this intermediate state to a final state in which the mechanisms for locking the free pinion of the ratio to be engaged are in the service position and those of the free pinion of the previously engaged ratio are in the idle position, and a step of controlling the clutch (E2) which takes place between the initial state and the final state.

2. Device according to claim 1, characterised in that the control of the clutch (E2) is effected between the initial state and the intermediate state.

3. Device according to claim 1, characterised in that the control of the clutch (E2) is effected between the intermediate state and the final state.

4. Device according to claim 1, characterized in that, for a change in transmission ratio which does not concern the last ratio, the control of the clutch (E2) comprises an at least partial clamping of this clutch, followed by a release.

5. Device according to claim 1, characterised in that the changes in transmission ratio which do not concern the last ratio comprise one and the same sequence of operations of actuation of the locking mechanisms (24) for increasing and decreasing the ratios, this sequence being executed in a given order for increasing the ratios and in the reverse order for decreasing the ratios.

6. Device according to claim 5, characterised in that the control of the clutch (E2) comprises a partial progressive clamping of the clutch (E2) for bringing into service the locking mechanism for the ratio to be engaged and simultaneously the making idle of the locking mechanism for the engaged ratio, and then complete release of the clutch (E2).

7. Device according to claim 1, characterised in that the free pinions (22) of the transmission ratios are carried by the driven shaft (12).

8. Device according to claim 1, characterised in that the free pinions (22) are disposed in the order of the transmission ratios and in that it comprises a single cam (26) able to be moved in translation inside the shaft (12) carrying the free pinions.

9. Device according to claim 1, characterised in that the free pinions are disposed in the order 1, 3, 5, . . . , 2, 4, 6, . . . of the transmission ratios and in that it comprises two cams (26) able to be moved simultaneously in translation within the said shaft (12), one for the actuation of the locking mechanisms of the free pinions of the ratios 1, 3, 5, . . . , the other for the actuation of the locking mechanisms for the free pinions of the ratios 2, 4, 6, . . . .

10. Device according to claim 1, characterised in that the free pinions are disposed in the order 1, 4, 2, 5, 3, 6 of the transmission ratios and in that it comprises three cams (26) able to be moved simultaneously in translation within the said shaft (12), one for the actuation of the locking mechanisms for the free pinions of the ratios 1 and 4, the second for the actuation of the locking mechanisms for the free pinions for ratios 2 and 5, and the third for the actuation of the locking mechanisms for the free pinion of ratio 3.

11. Device according to claim 9, characterised in that the cams (26) are able to be moved in translation by a nut and screw system, in which the nut (66) carries the cams (26) and in which the screw is a threaded rod (28) driven in rotation by an actuator.

12. Device according to claim 11, characterised in that the nut (66) is guided in translation and immobilised in rotation on a fixed axial rod (72) on which it is engaged at one end, and is screwed at its other end onto the threaded rod (28).

13. Device according to claim 1, characterised in that the two locking mechanisms (24) for each free pinion are mounted axially on the same side of the free pinion.

14. Device according to claim 1, characterised in that the two locking mechanisms (24) for each free pinion are mounted axially on each side of the free pinion.

15. Device according to claim 1, characterised in that each locking mechanism (24) comprises a locking member such as a pawl (38) cooperating with a set of teeth (36) formed on a flank of the free pinion to allow the rotation of the pinion in one direction and to prevent it in the opposite direction, a pusher (40) actuated by an aforementioned cam (26) for the movement of the pawl into a service position in which it cooperates with the aforementioned set of teeth (36), and a return spring (44) pushing the pawl towards an idle position in which it is away from the aforementioned set of teeth (36).

16. Device according to claim 15, characterised in that the pawls (38) are carried by washers (46) interposed between the free pinions (22) and rotationally fixed to the shaft (12) of the free pinions.

17. Device according to claim 15, characterised in that the pushers (40) for moving the pawls extend radially in orifices in the a tubular wall of the aforementioned shaft (12) and cooperate with the pawls by means of elastically deformable members (42).

18. Device according to claim 1, characterised in that the at least one cam (26) is fixed in rotation.

19. Device according to claim 1, characterised in that the at least one cam (26) is driven in rotation by the shaft (12) of the free pinions.

20. Device according to claim 19, characterised in that each cam (26) is mounted by screwing onto a threaded rod (28) fixed in translation and connected to a drive member by an epicyclic gear.

21. Device according to claim 20, characterised in that the epicyclic gear is a double epicyclic gear.

22. Device according to claim 1, characterised in that it comprises another clutch (E1) connecting the driving shaft (10) to the input shaft (18), the driving pinion (20) of the first transmission ratio being fixed in rotation to the input shaft (18) and the associated driven pinion (22) being able to be fixed in rotation to the driven shaft (12) by aforementioned locking mechanisms (24).

23. Device according to claim 1, characterised in that it comprises another clutch (E1) connecting the input shaft (18) to the driving pinion (20) of the first transmission ratio, the driven pinion of which is fixed in rotation to the driven shaft (12).

24. Device according to claim 1, characterised in that the driving pinion (20) of the last transmission ratio is fixed in rotation to the input shaft (18) and in that the clutch (E2) associated with this driving pinion is replaced by a brake (86) carried by a casing of the device and acting on the input shaft (18) for reducing its speed or by synchronisation means (80) for an intermediate pinion (78) of a reverse running ratio, of which the driving pinion (20) is fixed in rotation to the input shaft (18).

* * * * *